United States Patent [19]
Dumas

[11] Patent Number: 5,921,405
[45] Date of Patent: Jul. 13, 1999

[54] DEVICE FOR STORING AND ARRANGING A PLURALITY OF COMPACT DISK STORAGE CASES AGAINST A WALL

[76] Inventor: Ray Dumas, 165 Bathurst Street, #609, Toronto, Ontario, Canada, M5V 1S9

[21] Appl. No.: 08/851,841

[22] Filed: May 6, 1997

Related U.S. Application Data

[51] Int. Cl.⁶ .................................................. A47F 7/00
[52] U.S. Cl. .................. 211/40; 211/DIG. 1; 211/94.01; 248/206.5
[58] Field of Search ................................... 211/40, 88.01, 211/71.01, 94.01, DIG. 1; 248/206.5, 205.2; 312/9.9; 206/308.1

[56] References Cited

U.S. PATENT DOCUMENTS

| | | | |
|---|---|---|---|
| 4,605,292 | 8/1986 | McIntosh | 248/206.5 X |
| 4,951,826 | 8/1990 | Tompkins | 211/40 |
| 5,105,952 | 4/1992 | Krattiger | 211/40 |
| 5,148,925 | 9/1992 | Althoff et al. | 211/40 |
| 5,269,083 | 12/1993 | Vampatella et al. | 248/206.5 X |
| 5,351,835 | 10/1994 | Hallgren | 211/40 |
| 5,456,368 | 10/1995 | Zehnder | 211/40 |
| 5,462,177 | 10/1995 | O'Donnell | 211/40 |
| 5,497,889 | 3/1996 | Genovesi | 211/40 |
| 5,706,955 | 1/1998 | Andersson | 211/40 |

*Primary Examiner*—Robert W. Gibson, Jr.

[57] ABSTRACT

The present invention relates to a device for storing and arranging a plurality of compact disks against a wall. The device includes a metal channel which has a substantially C-shaped cross-section and which is dimensioned to receive an integral number of compact disk storage cases along its length. Mounting means are included to enable the channel member to be mounted against a wall. Furthermore, a plurality of magnets are provided. Each of these magnets are adhesively secured at approximately one-half inch from a top edge of a storage case for a compact disk. This magnet enables the individual storage case to be magnetically secured upon the front side of the channel member such that the rear surface of the storage case is positioned against the front side of the channel member. Furthermore, the distance between the magnet and the top edge of the storage case enables the case to be pivoted out of the channel member.

1 Claim, 3 Drawing Sheets

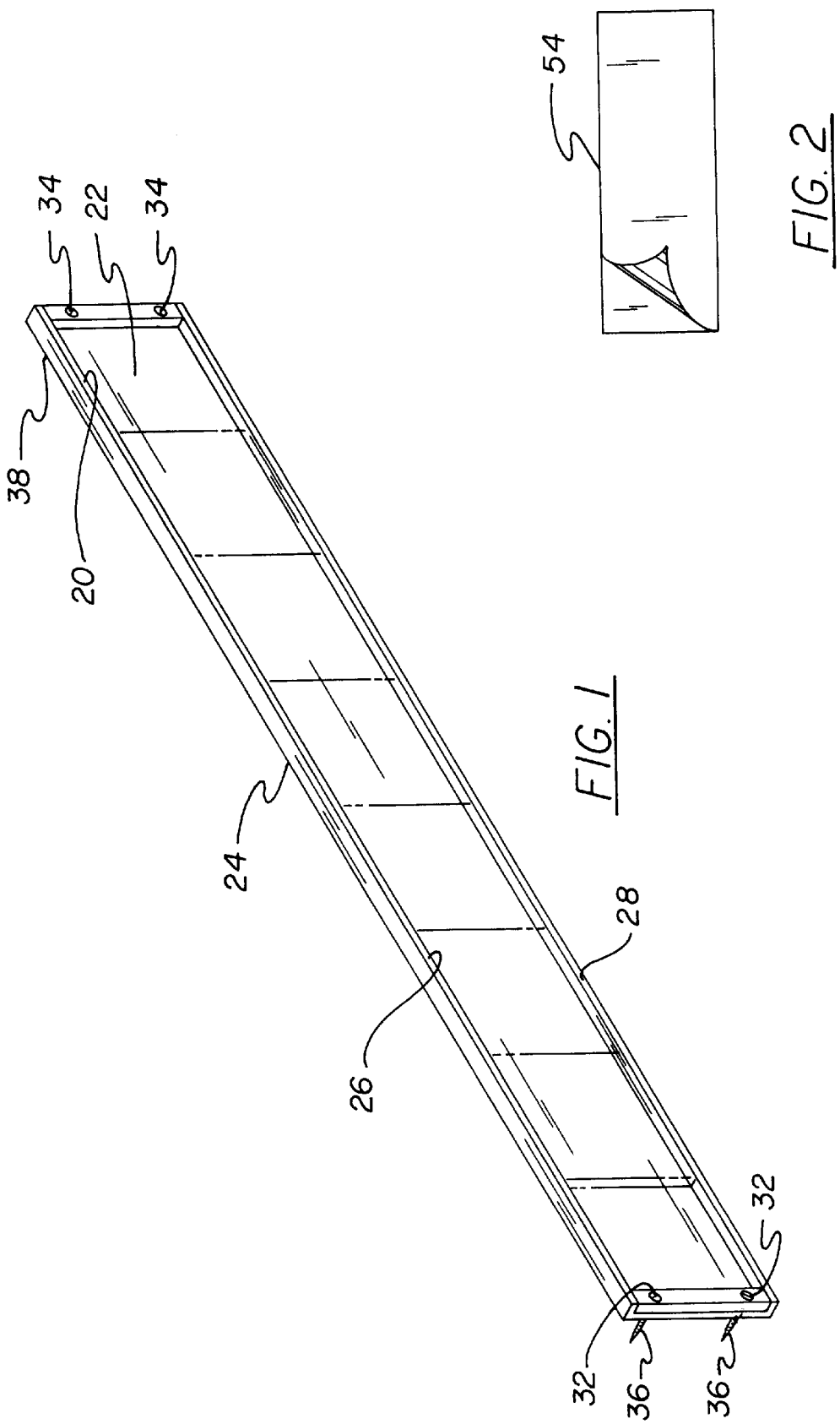

5,921,405

DEVICE FOR STORING AND ARRANGING A PLURALITY OF COMPACT DISK STORAGE CASES AGAINST A WALL

BACKGROUND OF THE INVENTION

1. Field of the Invention

The present invention relates to a new and improved device for storing and arranging a plurality of compact disk storage cases against a wall and, more particularly, pertains to a device for storing compact disks.

2. Description of the Prior Art

The use of compact disk storage systems is known in the prior art. More specifically, compact disk storage systems heretofore devised and utilized for the purpose of storing a plurality of compact disk storage cases are known to consist basically of familiar, expected, and obvious structural configurations, notwithstanding the myriad of designs encompassed by the crowded prior art which has been developed for the fulfillment of countless objectives and requirements.

The prior art discloses a large number of devices for storing compact disks. By way of example, U.S. Des. Pat. No. 3,385,702 to Koeppel; U.S. Pat. No. 5,118,170 to Olivas; U.S. Pat. No. 5,341,943 to Fraser; U.S. Pat. No. 5,253,767 to Koeppel all relate to storage systems for compact disk storage cases. Furthermore, U.S. Pat. No. 3,552,705 to Caster and U.S. Pat. No. 5,277,088 to Vasichek et al. both relate to magnetic means for securing objects.

In this respect, the device for storing and arranging a plurality of compact disk storage cases according to the present invention substantially departs from the conventional concepts and designs of the prior art, and in doing so provides an apparatus primarily developed for the purpose of storing compact disks.

Therefore, it can be appreciated that there exists a continuing need for a new and improved device for storing and arranging a plurality of compact disk storage cases which can be used for storing compact disks. In this regard, the present invention substantially fulfills this need.

SUMMARY OF THE INVENTION

In view of the foregoing disadvantages inherent in the known types of compact disk storage systems now present in the prior art, the present invention provides an improved device for storing and arranging a plurality of compact disk storage cases. As such, the general purpose of the present invention, which will be described subsequently in greater detail, is to provide a new and improved device for storing and arranging a plurality of compact disk storage cases and methods which have all the advantages of the prior art and none of the disadvantages.

The present device relates to a system for storing and arranging a plurality of compact disk storage cases against a wall. The device includes a metal channel member defined by a front side, a back side, a first end, a second end, a top edge, and a bottom edge wherein the channel has a substantially C-shaped cross-section opening towards the front side. This metal channel member is dimensioned to receive an integral number of compact disk cases along its length. A first pair of mounting holes is formed through the first end of the channel member while a second pair of mounting holes is formed through the second end of the channel member. A first pair of screws is adapted to be inserted through the first pair of mounting holes while a second pair of screws is adapted to be inserted through the second pair of mounting holes. These first and second pairs of screws function to secure the channel member against a wall. A plurality of magnets are included. The magnets are adhesively secured to a rear surface of a storage case for a compact disk at a distance from a top edge of the storage case. The magnet enables an individual storage case to be magnetically secured upon the front side of the channel member such that the rear surface of the storage case is positioned against the front side of the channel member with the top and bottom edges of the storage case contacting the top and bottom edges of the channel member. The distance between a magnet and the top edge of the storage case enables the case to be pivoted out of the channel member.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved device for storing and arranging a plurality of compact disk storage cases which has all the advantages of the prior art compact disk storage systems and none of the disadvantages.

It is another object of the present invention to provide a new and improved device for storing and arranging a plurality of compact disk storage cases which may be easily and efficiently manufactured and marketed.

It is a further object of the present invention to provide a new and improved device for storing and arranging a plurality of compact disk storage cases which is of a durable and reliable construction.

An even further object of the present invention is to provide a new and improved device for storing and arranging a plurality of compact disk storage cases which is susceptible of a low cost of manufacture with regard to both materials and labor, and which accordingly is then susceptible of low prices of sale to the consuming public, thereby making such compact disk storage systems economically available to the buying public.

Still yet another object of the present invention is to provide a new and improved device for storing and arranging a plurality of compact disk storage cases which provides in the apparatuses and methods of the prior art some of the advantages thereof, while simultaneously overcoming some of the disadvantages normally associated therewith.

Even still another object of the present invention is to magnetically secure a compact disk against a wall.

Lastly, it is an object of the present invention to provide a device for storing and arranging a plurality of compact disks against a wall. The device includes a metal channel which has a substantially C-shaped cross-section and which is dimensioned to receive an integral number of compact disk storage cases along its length. Mounting means are included to enable the channel member to be mounted against a wall. Furthermore, a plurality of magnets are provided. Each of these magnets are adhesively secured at approximately one-half inch from a top edge of a storage case for a compact disk. This magnet enables the individual storage case to be magnetically secured upon the front side of the channel member such that the rear surface of the storage case is positioned against the front side of the channel member. Furthermore, the distance between the magnet and the top edge of the storage case enables the case to be pivoted out of the channel member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the storage case in accordance with the present invention.

FIG. 2 is a showing of the magnet which is employed within the system of the present invention.

The same reference numerals refer to the same parts throughout the various Figures.

DESCRIPTION OF THE PREFERRED EMBODIMENT

Figure 3:
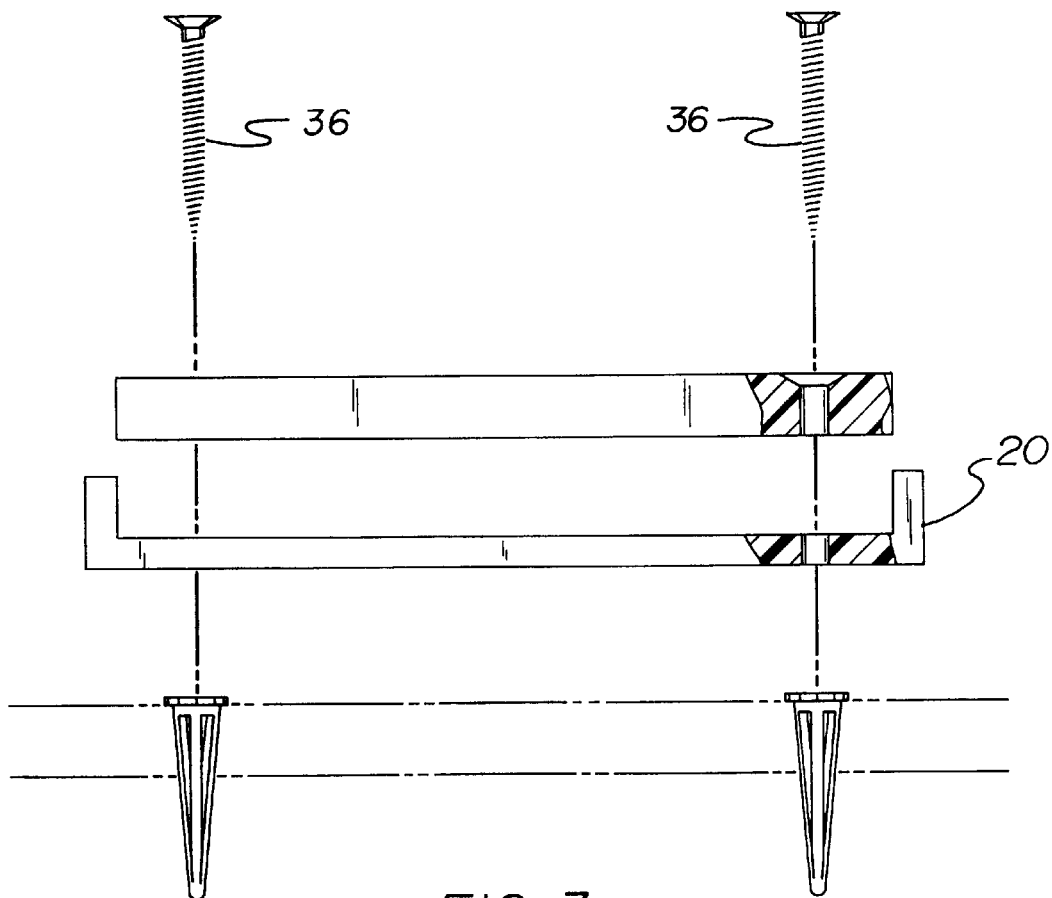
FIG. 3 is an exploded view of the mounting system for the channel member in accordance with the present invention.
Figure 4:
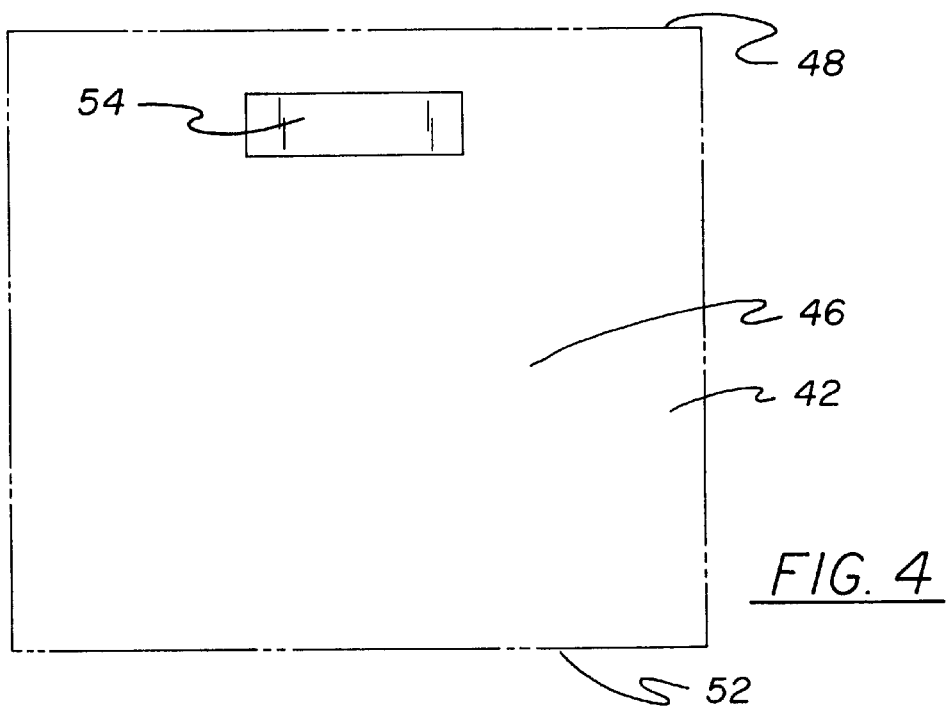
FIG. 4 is a view of the rear surface of the storage case in accordance with the present invention.
Figure 5:
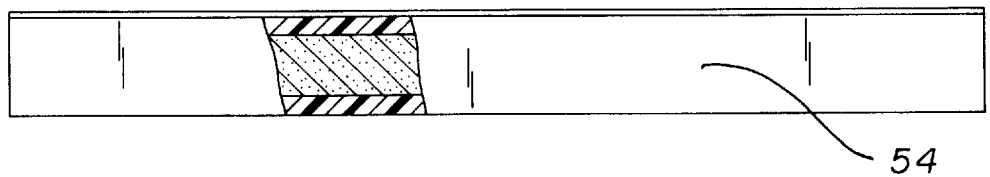
FIG. 5 is a side view of the magnet in accordance with the present invention.

With reference now to the drawings, and in particular to FIG. 1 thereof, the preferred embodiment of the new and improved device for storing and arranging a plurality of compact disk storage cases embodying the principles and concepts of the present invention and generally designated by the reference numeral 10 will be described.

The present invention relates to a device for storing and arranging a number of compact disk storage cases against a wall. In its broadest context, the present invention includes a metal channel member which is adapted to affixed to a vertical wall and a plurality of compact disk cases which are adapted to secured within the metal channel. Each of the compact disk cases is secured to the metal channel member by way of a magnet. The various components of the present invention, as well as the manner in which they interrelate, will be described in greater detail hereinafter.

Figure 6:
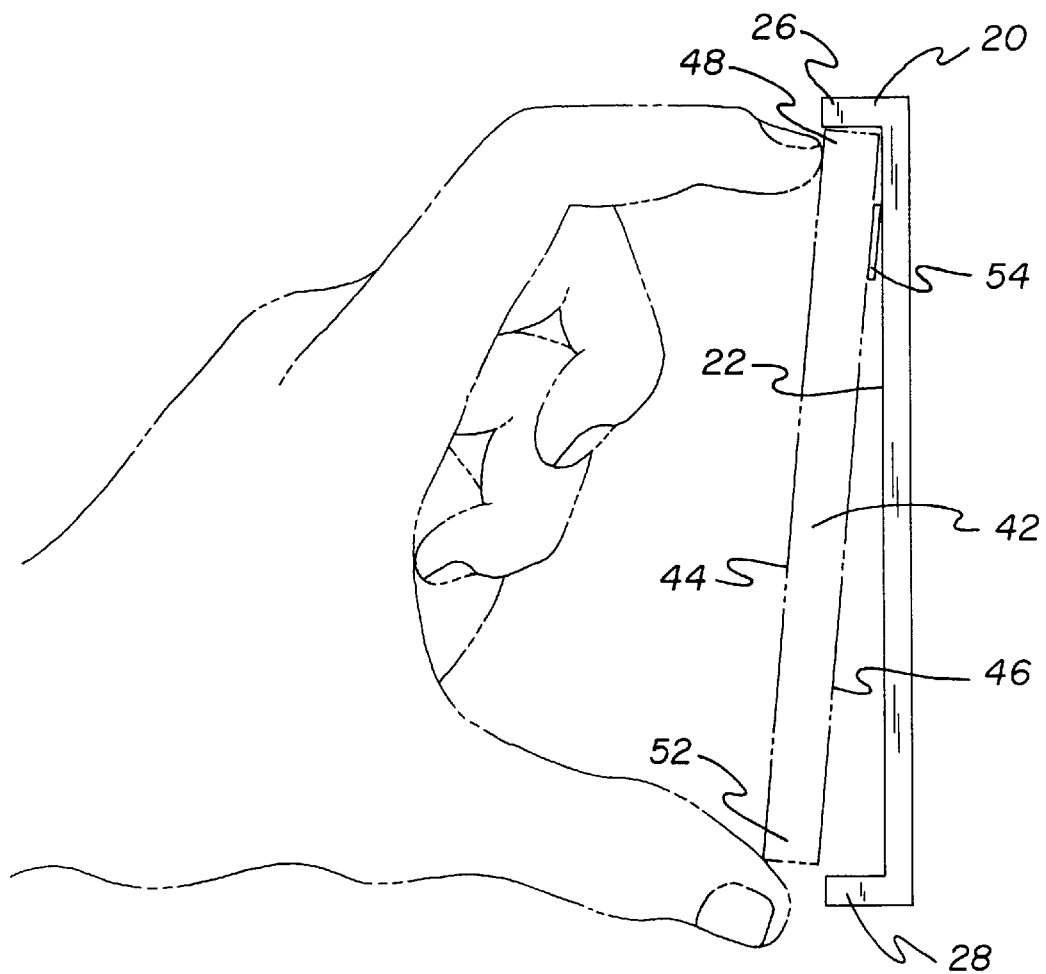
FIG. 6 is a view of an individual storage case being removed from the metal channel.

The metal channel member 20 is defined by a front side 22, a back side 24, a first end, a second end, a top edge 26 and a bottom edge 28. As depicted in FIG. 6, the channel member 20 has a substantially C-shaped cross-section with the open region extending toward the front side 22 of the channel member 20. Furthermore, the channel member is dimensioned to receive an integral number of compact disk cases along its length. These compact disk cases are of a standard construction with standardized dimensions and are adapted to receive a compact disk within its interior.

A first pair of mounting holes 32 are formed through the first end of the channel member 20. Likewise, a second pair of mounting holes 38 are formed through the second end of the channel member 20. These two sets of mounting holes are adapted to cooperate with two pairs of screws. Namely, a first pair of screws 38 are adapted to be inserted through the first pair of mounting holes 32, likewise a second pair of screws 38 are adapted to be inserted through the second pair of mounting holes 34. The first and second pairs of screws function to secure the channel member 20 upon a wall. Additionally, end pieces are provided for positioning at opposite ends of the channel member. The end pieces have apertures therethrough corresponding to the mounting holes for receiving the screws. The end pieces serve to provide closed ends and stability to the channel member. Furthermore, wall anchors can be employed in an effort to provide a secure coupling between the mounting screws and the wall. All of these elements can most clearly be seen in FIG. 3.

As indicated, the metal channel 20 is adapted to hold a plurality of compact disk storage cases. Each of these storage cases 42 has a front surface 44, a rear surface 46, a top edge 48, a bottom edge 52 and two sides edges. As previously indicated, these storage cases are of a standard size and are generally made of a transparent plastic material. Each of the storage cases 42 further includes a magnet 54 adhesively secured to its rear surface 46. This magnet 54 functions in securing the storage case to the metal channel 20. Although adhesive is the preferred embodiment for securing the magnet 54 to an individual storage case 42 any number of securement means can be employed. In the preferred embodiment, the individual magnet 54 includes an adhesive backing with a peelable backing sheet secured thereon to protect the adhesive until a user wishes to secure the magnet to the storage case. In the preferred embodiment, the magnet 54 is secured to the rear surface 46 of the storage case 42 at a distance from the top edge 48 of the individual storage case 42. With the magnet 54 secured upon a case 42, the case can be magnetically secured upon the front side 22 of the channel member 20 such that the rear surface 46 of the storage case 42 is positioned against the front side 22 of the channel member 20. In this arrangement, the top and bottom edges 48 and 52, respectively, of the storage case contact the top and bottom edges 26 and 28, respectively, of the channel member 20. The distance between the magnet 54 and the top edge 48 of the storage case 42 enables the individual storage case 42 to be easily removed from the channel member 20. As illustrated in FIG. 6, when a user wishes to remove the storage case 42 he or she applies pressure to the top edge of the storage case 42 above the magnet 54. In this manner the storage case 42 is pivoted out of the channel member. In the preferred embodiment, the distance between the magnet 54 and the top edge 48 of the storage case 42 is one-half inch. Furthermore, the magnet should be centered upon the rear surface 46 of the storage case 42. If the magnet 54 is positioned too closely to the top edge 48 of the storage case 42 the pivoting of the storage case would become impossible. Alternatively if the magnet 54 is positioned too closely to the center of the storage case 42 the case could not be pivoted far enough to enable a user to extract the storage case 42 from the metal channel 20.

A user of the present invention can employ a number of the individual metal channels in order to create an array of storage cases upon a wall. In the preferred embodiment, the metal channel 20 has a length to accommodate either four or eight individual compact disks. Thus, a user could secure a number of channels, either end-to-end or one on top of another, in order to create a desired matrix of storage area. In addition to each of the cases being able to be pivotally removed from a channel, a case can also be slid side-to-side within a metal channel 20. However, this requires that one or more spaces be present within the channel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combination storage device with compact disk storage cases for storing and arranging a plurality of compact disk storage cases against a wall, the device comprising, in combination:

a metal channel member having a front side, a back side, a first end, a second end, a top edge, and a bottom edge, the channel having a substantially C-shaped cross-section opening towards the front side, the metal channel member dimensioned to receive an integral number of compact disk cases along its length;

a first pair of mounting holes formed through the first end of the channel member, a second pair of mounting holes formed through the second end of the channel member;

a first pair of screws adapted to be inserted through the first pair of mounting holes, a second pair of screws adapted to be inserted through the second pair of mounting holes, the first and second pairs of screws functioning to secure the channel member to a wall;

removable end pieces for positioning at opposite ends of the channel member with apertures therethrough which correspond to one of the pairs of the mounting holes for receiving the screws, wherein the end pieces define closed ends of the channel member; and a plurality of magnets, each of the magnets being adhesively secured to a central extent of the rear surface of a storage case for a compact disk at a distance from a top edge of the storage case, the magnet enabling an individual storage case to be magnetically secured upon the front side of the channel member such that the rear surface of the storage case is positioned against the front side of the channel member with the top and bottom edges of the storage case contacting the top and bottom edges of the channel member, the distance between the magnet and the top edge of the storage case enabling the case to be pivoted out of the channel member by applying pressure to the top edge of storage case, wherein the distance is ½ of an inch.

* * * * *